United States Patent [19]

Webster et al.

[11] 4,018,619

[45] Apr. 19, 1977

[54] HIGHLY ACTIVATED MIXTURES FOR CONSTRUCTING LOAD BEARING SURFACES AND METHOD OF MAKING THE SAME

[75] Inventors: William C. Webster, Norristown; Charles L. Smith, Conshohocken, both of Pa.

[73] Assignee: IU Technology Corporation, Miami, Fla.

[22] Filed: Jan. 22, 1976

[21] Appl. No.: 651,457

Related U.S. Application Data

[60] Continuation of Ser. No. 508,221, Sept. 23, 1974, abandoned, which is a division of Ser. No. 285,257, Aug. 31, 1972, Pat. No. 3,385,084, which is a continuation-in-part of Ser. No. 23,887, March 30, 1970.

[52] U.S. Cl. .............................. 106/118; 106/120; 106/DIG. 1
[51] Int. Cl.² .......................................... C04B 7/34
[58] Field of Search .............. 106/118, 120, DIG. 1

[56] References Cited

UNITED STATES PATENTS

| 3,066,031 | 11/1962 | Schifferle | 106/118 |
| 3,852,084 | 12/1974 | Webster et al. | 106/118 |

*Primary Examiner*—J. Poer
*Attorney, Agent, or Firm*—Miller & Prestia

[57] ABSTRACT

Improved cementitious composition results from a process comprised of mechanical size reduction and activation of a mixture of lime and fly ash and the addition thereto of fly ash and aggregate, as needed, to make a mix of the desired proportions. A quicker and more complete reaction between the lime and fly ash results from deagglomeration of lime particles caused by interaction with the fly ash and/or by the increased availability of reactant materials due to particle size reduction of both the lime and the fly ash. The mechanical size reduction and activation process may be carried out, for example, in a ball mill or centrifugal impact mill.

5 Claims, 11 Drawing Figures

HIGHLY ACTIVATED MIXTURES FOR CONSTRUCTING LOAD BEARING SURFACES AND METHOD OF MAKING THE SAME

FIELD AND BACKGROUND OF THE INVENTION

This is a continuation of application Ser. No. 508,221, filed Sept. 23, 1974 now abandoned, which is in turn a division of Ser. No. 285,257 filed Aug. 31, 1972, now U.S. Pat. No. 3,385,084, which is a continuation-in-part application of application Ser. No. 23,887, filed Mar. 30, 1970.

This invention relates to a more reactive cementitious composition, to the use thereof, and to a method of making such a composition. More specifically, it relates to an alkaline earth fly ash cementitious material which hardens relatively quickly and has greater compressive strength as compared to prior art lime-fly ash cements.

The terms "pozzolan" and "natural pozzolan" refer to materials which are ordinarily of volcanic origin and which in the presence of alkaline earth oxides and moisture enter into a slow reaction causing the growth of strength bonds throughout the mass, and which ultimately set up to form a hard rock-like material. The term "fly ash" as used in the present specification is intended, except as noted below, to indicate the finely divided ash residue produced by the combustion of pulverized coal, which ash is carried off with the gases exhausted from the furnace in which the coal is burned and which is collected from these gases usually by means of suitable precipitation apparatus such as electrical precipitators. Those finely pulverized ashes resulting from combustion of oil and from combustion of waste materials in a large incinerator can also be utilized in the methods described herein providing their chemical compositions are reasonably similar to pulverized coal fly ashes. The fly ash so obtained is in a finely divided state such that usually at least 70% by weight passes through a 200-mesh sieve, although incinerator ashes may be considerably coarser. Fly ash may be considered an "artificial pozzolan", as distinguished from a "natural pozzolan".

As used throughout this specification the term "lime" indicates, hydrated lime. The term "hydrated lime" indicates a dry powder obtained by treating quicklime with sufficient water to satisfy its chemical affinity for water under the conditions of its hydration. It consists essentially of calcium hydroxide in conjunction with magnesium oxide and/or magnesium hydroxide. "Quicklime" is used to indicate a calcined material, the major portion of which is calcium oxide or calcium oxide in conjunction with lesser amounts of magnesium oxide, capable of slaking with water.

Pozzolanic cementitious compositions based on the reaction between lime and fly ash are well known, particularly for use as roadway and runway subsurfaces. Such compositions are taught for example in U.S. Pat. No. 2,564,690 — Havelin et al and U.S. Pat. No. 3,076,717 — Minnick.

Aggregate is often also included in these compositions. The term "aggregate" refers to natural or artificial inorganic materials most of which are substantially chemically inert with respect to fly ash and lime, and substantially insoluble in water. Typically, aggregate may comprise limestone, sand, blast furnace slag, gravel, synthetic aggregates and other similar material.

The primary difficulty with lime-pozzolan or lime-fly ash cementitious materials is their very slow rate of hardening. This results in related problems of durability under alternate cycles of wetting and drying and of freezing and thawing. It is, therefore, the general object of the present invention to provide a lime-fly ash cementitious composition, and methods for producing and using such composition which will harden more quickly than prior art material and which will have greater compressive strength than prior art material when normal amounts of cementitious materials are used, or equal compressive strength when less cementitious material, (particularly lime) is used.

BRIEF DESCRIPTION OF THE INVENTION

This and other objects are met, in accordance with the present invention, by the manufacture and use of a highly activated lime-fly ash composition comprised of a highly activated, reduced particle size lime combined with fly ash, some of which is also more reactive due to its mechanical treatment in combination with lime. More specifically, lime, in the amount required in the final mix (generally on the order of 1–40 weight % of the final mix, excluding aggregate) is mechanically treated, such as by ball milling, with fly ash with a weight proportion of lime to fly ash in the range from 1:24 to 9:1. This activates both the fly ash and the lime. However, the enhanced reactivity of the lime, which also happens to be a good deal more expensive than the fly ash, is of greater significance. The activated lime may be used in any lime reaction where more active lime is desired and the presence of fly ash is not objectionable. In the present invention, the activated lime-fly ash is used as a pre-mix which is then diluted with unactivated fly ash up to the desired fly ash content in the final mix. In any event, the pre-mix should comprise no more than a third of the total cementitious material.

The unique lime-fly ash composition of this invention results from the interaction of small glassy spheres, which are contained in and produced as a component of the fly ash, with other particles, including the lime particles particulary, or with themselves. The lime particles are both deagglomerated and fractured in this activation process; generally, the final lime particle size is such that the maximum lime particle dimensions are on the order of 35 microns or less. Apart from ball milling, similar results may be obtained by any of various other activation techniques capable of producing rapid interparticle movement in particulate mixtures. The requirement of the activation technique is that is should cause the small glassy spheres in the fly ash to interact with the other particles (and to some extent) with themselves in such a way as to produce the deagglomeration and particle size reduction and resulting activation.

Aggregate, reactive or otherwise, including, for example, gravel, slag, sand, crushed stone, or limestone, may be added to the activated mixture of the present invention prior to use.

DETAILED DESCRIPTION OF THE INVENTION

The present invention may be better understood by reference to the following detailed description, taken in conjunction with the figures, in which.

It has been found that when fly ash is produced at high temperatures in coal burning steam generators, some of the silica and alumina content of the ash solidifies in situ in the form of tiny, glassy spheres, and that such fly ash in combination with lime can be processed in the presence of such tiny, glassy spheres to produce a mixture which develops compressive strength relatively quickly and which imparts similar characteristics to a further mixture with untreated fly ash. These relatively hard glassy spheres generally comprise 40–60% of the fly ash and are 1–70 microns in diameter, depending on the origin of the fly ash. In the activation process, therefore, they act as microscopic grinding balls, fracturing other particles in the mixture, including, particularly, non-glassy fly ash particles and lime particles, and also deagglomerating the lime particles. Reactive compounds in the lime and in the fraction of the fly ash not made up of glassy spheres, such as calcium oxide (which is generally encapsulated in a shell of calcium sulfate) and magnesium oxide (which is generally covered by a shell of dead-burned material of the same compound) are thus freed. Other reactive compounds in the non-glassy portion of the fly ash include alkalis and sulfates.

Depending on the process, the glassy spheres themselves may also be fractured to a substantial extent. This exposes the inner surfaces of the glassy spheres, which are generally of a siliceous-aluminous composition having a different and higher degree of reactivity, as compared to the outer material of these spheres due to stress-induced crystalline disorientation caused by the rapid cooling of these glassy particles. Metastable species and certain other reactive components trapped in solid solution by the rapid cooling and formation of the glassy particles are also freed as the glassy spheres are fractured.

Generally then, reactivity of the mixture is increased by the increased availability of reactive materials, the microdissemination of these materials and the increased surface area of reactive particles.

Figure 1:
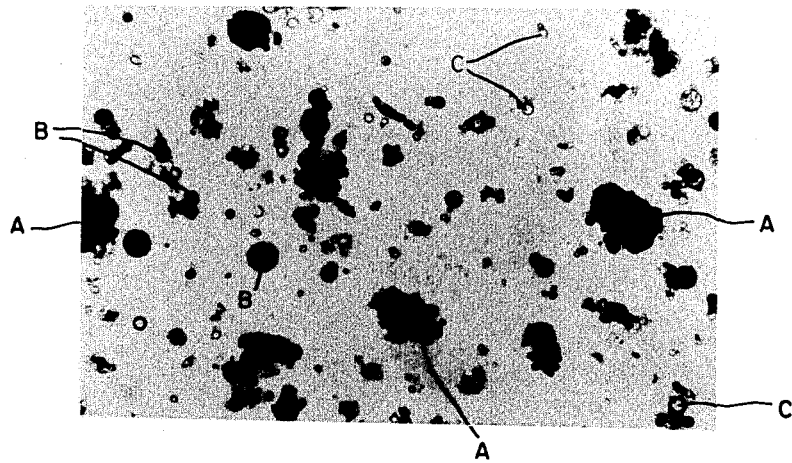
FIG. 1 is a photomicrograph of a typical lime-fly ash mixture dispersed in a conventional manner.
Figure 2:
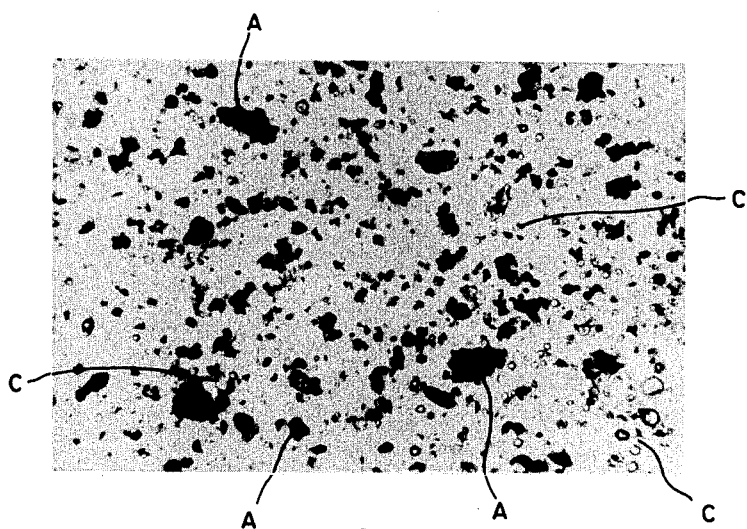
FIG. 2 is a lime-fly ash mixture like that in FIG. 1 after treatment in accordance with the present invention.

These characteristics are best illustrated by the photomicrographs of FIGS. 1–6. Referring more specifically to FIG. 1, there is shown a 1:10 lime-fly ash mixture blended by vigorously shaking together the components of the mixture in a conventional manner. Clearly visible are large particles of lime A, with a maximum dimension on the order of 100 microns, and smaller particles of fly ash components, B, including specifically glassy, spherical particles, C. After treating the same materials in a laboratory batch mill for 30 minutes, the mixture, as seen in FIG. 2 is intimately interdispersed. More importantly lime particles A are seen clearly to be deagglomerated, and the particle size of the components generally has been reduced. With respect specifically to the deagglomerated lime particles, their maximum dimension, as seen in FIG. 2, is generally below 35 microns. Fractured glassy particles C are also clearly visible in FIG. 2.

Figure 3:
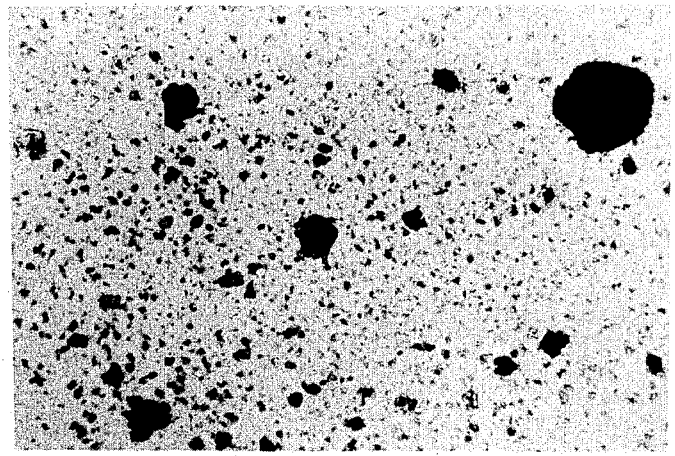
FIG. 3 is a photomicrograph of lime, identical to that used in the mixture seen in FIGS. 1 and 2.
Figure 4:
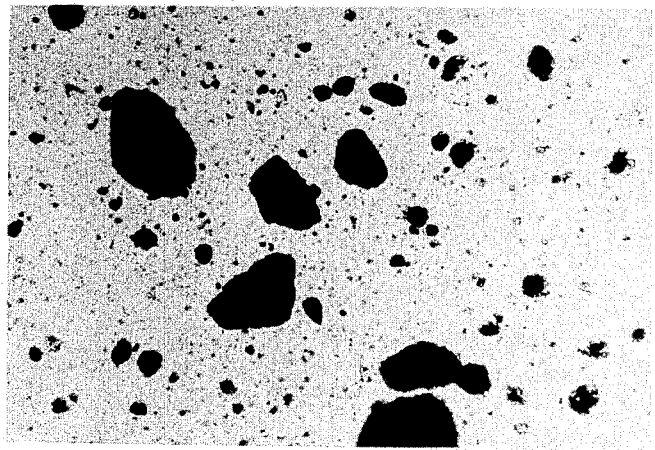
FIG. 4 is a photomicrograph of the lime seen in FIG. 3 after treatment similar to that used to produce the mixture seen in FIG. 2.

By comparison lime, a photomicrograph of which is shown in FIG. 3, when treated separately in a batch mill for 30 minutes does not break down as it does when lime and fly ash are treated together. Instead, as seen in FIG. 4, the agglomerate size of the lime particles remains the same or increases. The same phenomenon is described in U.S. Pat. No. 2,409,546 — B. L. Corson.

Figure 5:
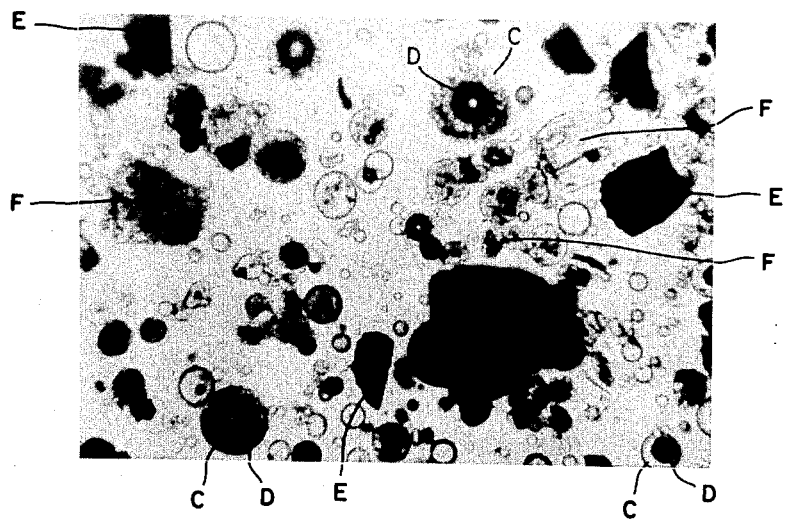
FIGS. 5 and 6 are photomicrographs of typical bituminous fly ashes showing the glassy spheres, materials entrapped within the glassy spheres, and non-glassy particles.
Figure 6:
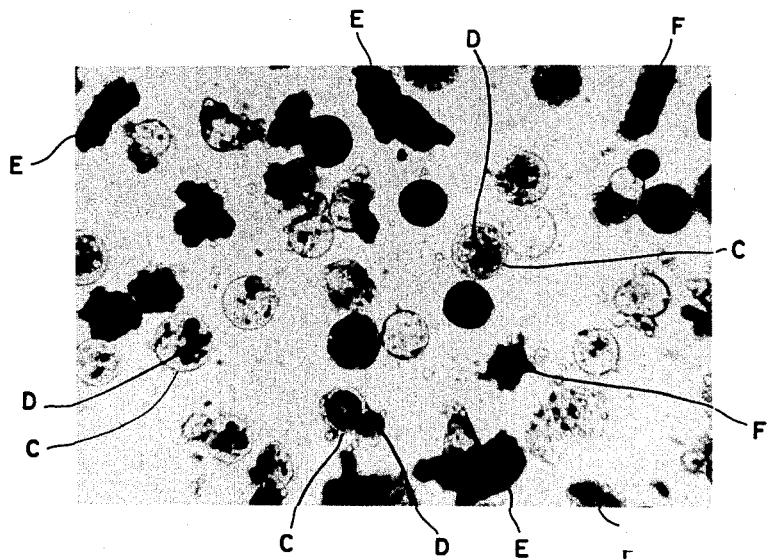

FIGS. 5 and 6 for purposes of comparison are photomicrographs of two typical fly ashes including glassy spheres C with particles D trapped therein. Other fly ash components discernible in FIGS. 5 and 6 include unburned carbon particles E and other crystalline particles F.

Figure 7:
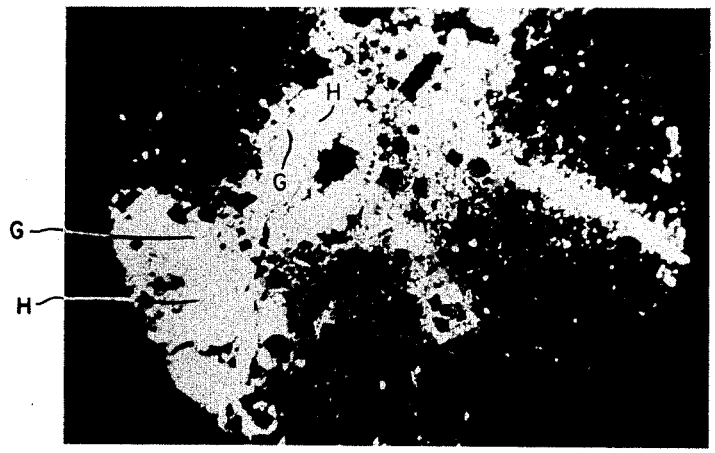
FIGS. 7 and 8 are photomicrographs, respectively, with polarized and non-polarized light of a cured hardened lime-fly ash mixture.
Figure 8:
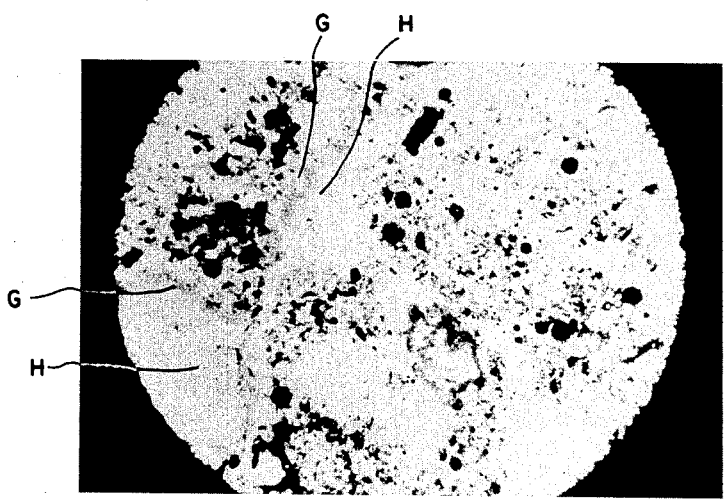
Figure 9:
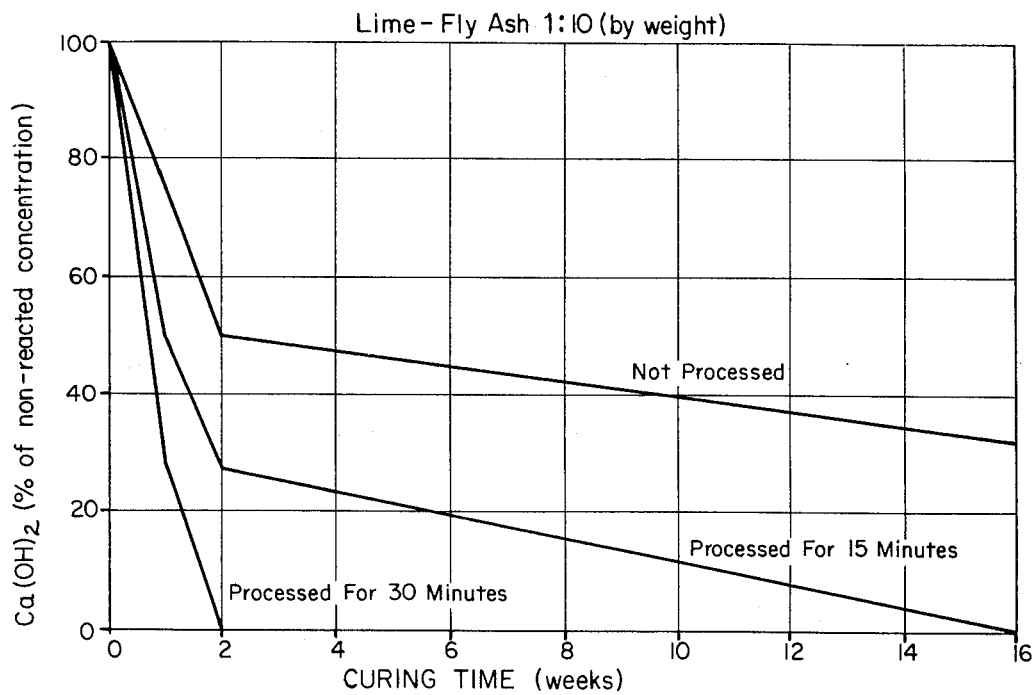
FIG. 9 is a graph of unreacted calcium hydroxide remaining in cured lime-fly ash mixtures after various intervals in which mixtures treated in accordance with the present invention (but without further fly ash dilution) are compared to a mixture not so treated.

As pointed out previously, the particle size and the encapsulation and distribution of reactants in prior art lime-fly ash mixtures resulted in a relatively slow rate of reaction between these reactants. The detrimental effect of this relatively slow rate of reaction in prior art materials is enhanced by the fact that undesirable side reactions may compete with the main reaction to produce a variety of compounds, some of which may themselves further inhibit the main reaction. One example of such side reactions is the formation of calcium carbonate shells, around the agglomerated particles of lime, which significantly reduce the rate at which the remaining lime will react. These calcium carbonate shells are seen in the photomicrographs of FIGS. 7 and 8, taken respectively with polarized and non-polarized light, as a crystalline rim G around the lime particles H, virtually isolating the lime particles from further reaction. These photomicrographs in FIGS. 7 and 8 show a cross-section of a moist cured lime-fly ash specimen.

In the present invention, the effects of the foregoing inhibiting factors are substantially reduced. As evidence of this fact, numerous samples have shown that microdisseminated, reduced particle size, deagglomerated lime-fly ash cementitious material as described herein will react both more fully and more quickly as compared to prior art mixtures and this improvement may be observed in terms of unreacted lime remaining and strength developed by the material at succeeding time intervals, or by the strength developed in the same time period with lower lime concentrations.

In terms of reactivity in the lime-fly ash cementitious mixture, deagglomeration and/or fracturing of the lime particles to a maximum dimension below 35 microns is the most distinctive and significant effect contributing to this reactivity. Because lime can be thus treated in a proportion much higher in lime than is generally necessary and in view of the cost of lime and the cost of milling the mixture, by far the most practical way to take advantage of this process is to treat a high lime content pre-mix (the lime constituting from 4 to 90 weight % of the pre-mix) and then to dilute the pre-mix by blending it with unactivated fly ash to achieve the final lime-fly ash proportions; generally lime constitutes about 1–40%, by weight, excluding aggregate, of the final mixture and the pre-mix constitutes no more than 35% of the final mix. Thus, a more reactive lime-fly mixture with better early strength characteristics, as compared to lime-fly ash mixtures of the prior art with the same lime concentration, is produced by mechanical treatment of a relatively small fraction of the total mix. This is illustrated in the following examples.

EXAMPLE 1

For comparison to the present invention, a series of mixtures was prepared containing dolomitic monohydrated lime, bituminous fly ash, and siliceous sand. Three such mixtures contained 1%, 2% and 3% hydrated lime respectively, 20% bituminous fly ash in each case, and 79%, 78% and 77% siliceous sand. Each mixture was subjected to a structural strength test. Cylinders (4 inches diameter × 4.6 inches length) of the compositions were molded and placed in a sealed container. The containers were then placed in an oven which was maintained at 100° F. After designated periods of curing, the cylinders were removed from the ovens, saturated with water, and tested for unconfined compressive strength.

The three mixtures were tested after seven days of curing at 100° F. and the following results were obtained: With one percent lime, 329 psi; two percent lime, 556 psi; three percent lime, 685 psi. Tests were also made after a total of 14 days of curing and the results were as follows: With one percent lime, 400 psi; two percent lime, 756 psi; three percent lime, 910 psi.

Figure 10:
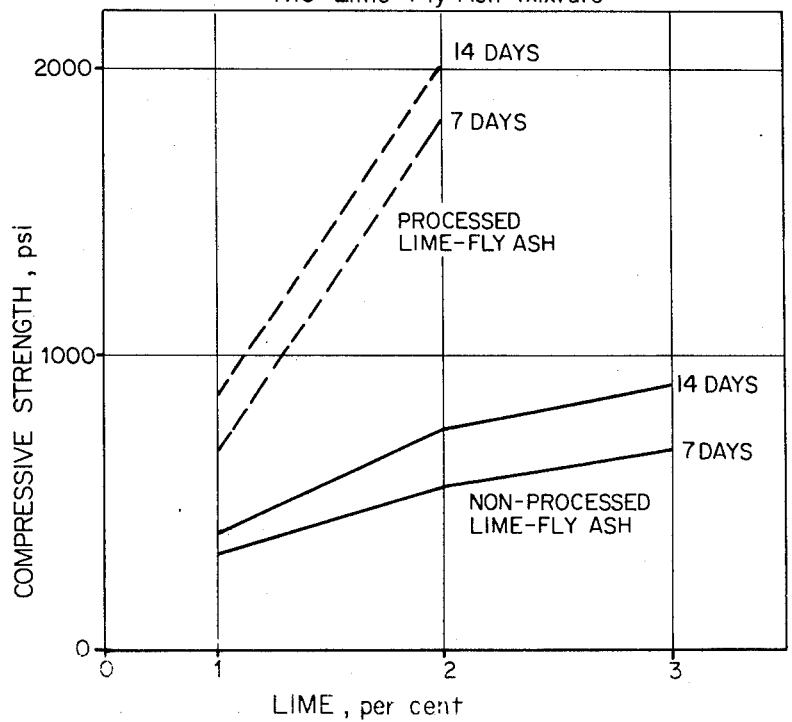
FIGS. 10 and 11 are graphs of compressive strength versus lime content of lime-fly ash-sand mixtures in which mixtures treated in accordance with the present invention are compared to mixtures not so treated.

In accordance with the present invention, a pre-mix consisting of one part by weight of dolomitic monohydrated lime and 10 parts by weight of bituminous fly ash were processed, by milling, for 30 minutes, in the laboratory batch mill used in producing the material shown in FIGS. 2 and 4. This mill comprises a cylinder, 23 inches in diameter and 10 inches long, which is rotated, pivoting on trunnions mounted at the center of each of the circular ends, at 30 revolutions per minute. There are three lifts (protruding ridges) equidistantly spaced around the interior of the cylindrical wall. These lifts are so designed that the ball charge is partially lifted in the direction of rotation, then dropped on the sample which is being ground. The ball charge used in this mill for fine grinding consists approximately of 300 lbs. of hardened steel balls, averaging ½ inch diameter. Generally, the mill is charged with 20 pounds of material to be processed. Mixtures were then made by adding to this pre-mix siliceous sand and unactivated fly ash to produce overall mix proportions as follows: One percent hydrated lime, 27% fly ash, and 72% siliceous sand; and 2% hydrated lime, 26% fly ash, and 72% siliceous sand. These compositions were tested in the manner described above. After seven days of curing at 100° F, the results were as follows with one percent lime, 705 psi, two percent lime, 1816 psi. After 14 days of curing at 100° F, the results were with one percent lime, 835 psi, and two percent lime, 1995 psi. The results of these tests, graphically presented in FIG. 10 demonstrate the dramatically improved strength of the lime-fly ash compositions of the present invention, even at lower lime content, as compared to prior art unactivated mixtures. It will be noted that in this Example, approximately 60% of the cementitious mix was milled.

EXAMPLE 2

Compositions involving the same dolomitic monohydrated lime, bituminous fly ash, and siliceous sand as those described in Example 1 were prepared. Three such mixes contained 3%, 4% and 5% hydrated lime respectively; 20% fly ash in each case; and 77%, 76% and 75% siliceous sand. The strengths obtained in these mixtures were, after seven days of curing at 100° F with three percent lime, 685 psi; four percent lime, 925 psi; and five percent lime, 986 psi. After 14 days of curing at 100° F, the results were as follows: With three percent lime, 910 psi; four percent lime, 1372 psi; five percent lime, 1528 psi.

A pre-mix consisting of one part by weight of the dolomitic monohydrated lime and two parts by weight of the bituminous fly ash was processed, in accordance with the present invention, in the manner described in Example 1 and as in that example the total lime content of the test compositions was derived from this processed lime-fly ash pre-mix. Sand and unactivated fly ash were then added to the pre-mix to produce compositions as follows: two percent hydrated lime, 26% fly ash, and 72% siliceous sand; and four percent hydrated lime, 24% fly ash, and 72% siliceous sand. Thus, the pre-mix consisted of less than 25% of the cementitious materials.

Figure 11:
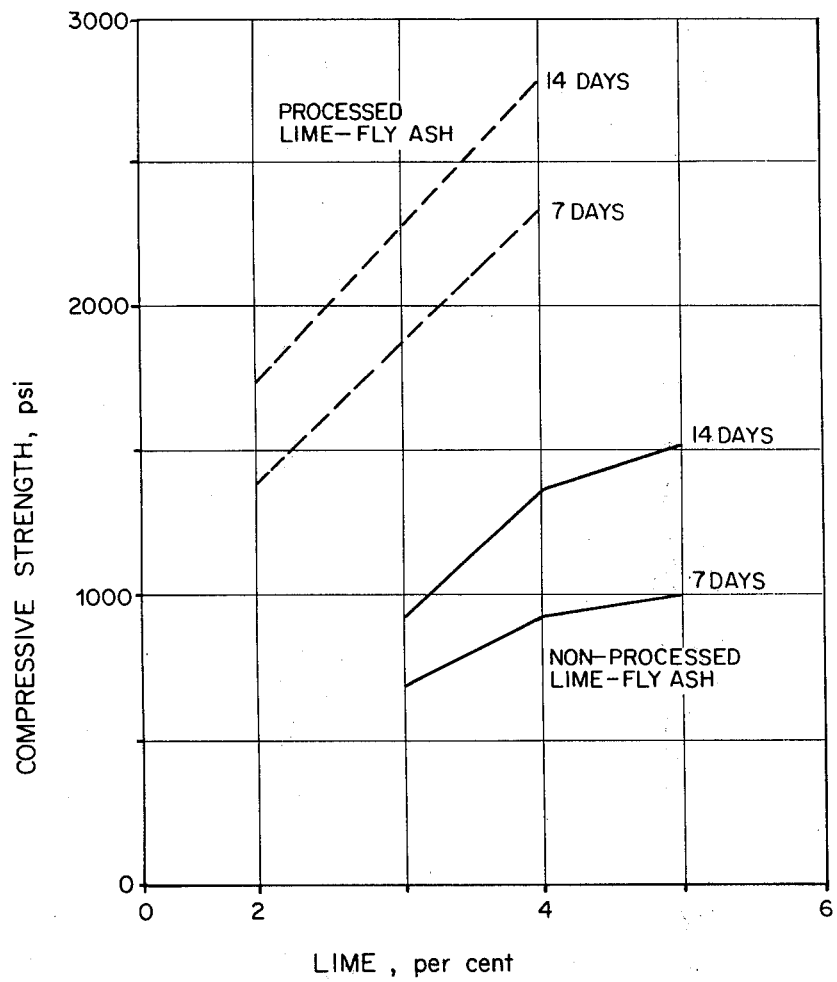

The unconfined compressive strength results on these mixtures after seven days of curing at 100° F were as follows with two percent lime, 1408 psi; and with 4 percent lime, 2315 psi. After 14 days of curing at 100° F, the results with 2% lime were, 1723 psi; and, with 4% lime, 2770 psi. These results, graphically summarized in FIG. 11, demonstrate, as did the previous example, the greater compressive strength of lime-fly ash compositions as taught herein versus comparable prior art compositions. Moreover, both Examples 1 and 2 show that this enhanced strength is obtainable with an aggregate material included in the highly activated, deagglomerated lime-fly ash of the present invention. In both cases, this improved strength is obtained by treatment of only a fraction of the total cementitious materials.

It should also be noted that while the mechanical treatment time in both Examples 1 and 2 is 30 minutes, much shorter treatment times may also be effective to improve the reactivity of lime-fly mixtures. The degree of improvement will, of course, depend on the particular material used, the particular method of activation used and the time of treatment. For example, with a very high speed impact impeller, only a few minutes may be necessary to produce a very high degree of improved reactivity.

Among the advantages of the present invention are that the cementitious material taught herein, because it hardens faster, can be used later in the construction season without danger of lack of durability under alternate cycles of freezing and thawing and may be used more readily in typical construction projects in which construction delays due to the slow hardening of the material cannot be tolerated. Further, the hardened product of the present invention is found to have greater load bearing ability as compared to prior art material of similar lime-fly ash content. Alternatively, the proportion of lime in a given composition may be reduced, if that composition is processed as taught herein, without sacrifice of compressive strength.

The means by which the highly activated, deagglomerated lime-fly ash mixture of the present invention is produced is not critical. Means other than those already mentioned which may be used to produce the activated mixtures of the present invention generally include any device which mechanically works the mixture with sufficient severity or which produces sufficient particle interaction to result in the micro-milling of the various particles in the mixture by the glassy spheres in the fly ash. One such additional processing means which is effective to produce the activated composition of the present invention is a conventional solids blender, known as a twin shell blender, which consists of a V-shaped mixing chamber comprising two cylindrical legs intersecting one another at 90°. In its starting position, the "V" is upright and a flat horizontal segment covers the bottom apex of the "V". A shaft, with mixing baffles mounted thereon extends horizontally through the vertical mid-section of the chamber in the plane formed by the axis of the two cylindrical legs of the "V". Mixing is effected by rotating the chamber about this shaft.

Regardless of the form of processing means used, the processing time required is inversely proportional to the severity of the activating means and directly proportional, as pointed out above, to the degree of activation required.

The method of making a hardenable, loading bearing surface by distributing an activated fly ash composition as described herein, over a placement bed and then compacting the fly ash composition is also within the scope of the present invention. Alternatively, this composition may be used as a hardenable fill, in abandoned mines for example, by placing the composition in the space to be filled and allowing it to harden. As pointed out above, the fly ash composition generally include deagglomerated lime and non-activated fly ash added after the activation process; it may also include an aggregate material such as crushed limestone.

For example, a composition consisting of 3% activated lime-fly ash (1:2 by weight), 10% added fly ash, and 87% aggregate, (the aggregate consisting of a crushed dolomitic limestone with a gradation as listed below) may be mixed in a pug mill type mixer with approximately 6% water (by weight of dry materials).

Aggregate Particle Size

| Screen Size | Percentage by Weight Passing |
| --- | --- |
| 1 ½" | 100 |
| 1" | 85 – 100 |
| ¾" | 70 – 100 |
| ⅜" | 50 – 100 |
| No. 4 | 35 – 75 |
| No. 10 | 20 – 50 |
| No. 40 | 10 – 30 |
| No. 60 | 5 – 20 |
| No. 200 | 0 – 15 |

This mixture may then be distributed over a placement bed consisting of compacted earth or crushed aggregate. The mixture itself, after compacting, will bear loads and may be covered immediately with asphaltic concrete. Further, the fly ash composition will harden in a relatively short time (as compared to prior art fly ash compositions with comparable lime or alkaline earth oxide contents) to develop its full load-bearing capability.

The following is claimed:

1. A method of producing a more reactive lime-fly ash cementitious composition, said method comprising mechanically treating a hydrated lime and fly ash pre-mixture, consisting of 4–90 weight % hydrated lime in the presence of glassy fly ash particles occurring therein, said mechanical treating comprising a process wherein said glassy fly ash particles are caused to interact mechanically with said hydrated lime to reduce the particle size of and to deagglomerate said hydrated lime, then adding to said pre-mix unactivated fly ash in an amount such that the proportion of the pre-mix in the total mix does not exceed 35% by weight.

2. A method, as recited in claim 1, wherein said mechanical treating is effected by a ball mill.

3. A method, as recited in claim 1, wherein said mechanical treating is effected by a high intensity centrifugal impeller.

4. A method, as recited in claim 1, wherein said mechanical treating is effected by a jet mixing device.

5. A method, as recited in claim 1, wherein said mechanical treating is effected by a twin-cylindrical shell, "V" shaped blender.

* * * * *